(12) United States Patent
Geurian et al.

(10) Patent No.: US 6,305,235 B1
(45) Date of Patent: *Oct. 23, 2001

(54) VARIABLE HEIGHT SENSOR TREE

(75) Inventors: John D. Geurian; David G. Cooper, both of Garland; Xuong P. Hong, Mesquite, all of TX (US)

(73) Assignee: Air Liquide America Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,607

(22) Filed: Oct. 9, 1998

(51) Int. Cl.[7] .............................. G01D 21/00; G01F 23/00
(52) U.S. Cl. ........................................ 73/866.5; 73/290 R
(58) Field of Search ................................ 73/40.5, 866.5, 73/290 R

(56) References Cited

U.S. PATENT DOCUMENTS 3,289,465 * 12/1966 Parker ..................................... 73/40.5
3,742,245 6/1973 Hallen et al. ......................... 307/118
5,100,298 3/1992 Shibata et al. ........................ 417/40

FOREIGN PATENT DOCUMENTS

| 660475 | 7/1965 | (BE) . |
| 9000520 | 3/1990 | (DE) . |
| 9416008 | * 12/1994 | (DE) . |
| 0386703 | 9/1990 | (EP) . |
| 2098282 | 3/1972 | (FR) . |

* cited by examiner

Primary Examiner—Hezron Williams
Assistant Examiner—Katina Wilson
(74) Attorney, Agent, or Firm—Burns, Doane, Swecker & Mathis, LLP

(57) ABSTRACT

A variable position sensing device is provided. The device includes a fixed track attached to a track holder. An adjustable sensor holder is adapted to receive a sensor and is capable of sliding and locking into position on the fixed track. The sensor device has particular applicability and the semiconductor manufacturing industry for setting sensors at different positions in a liquid chemical holding vessel.

14 Claims, 5 Drawing Sheets

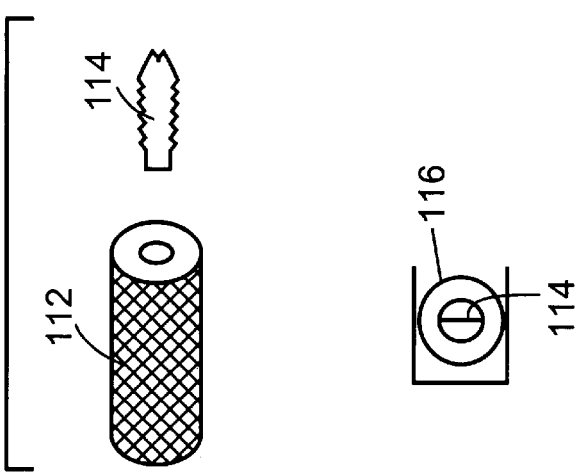
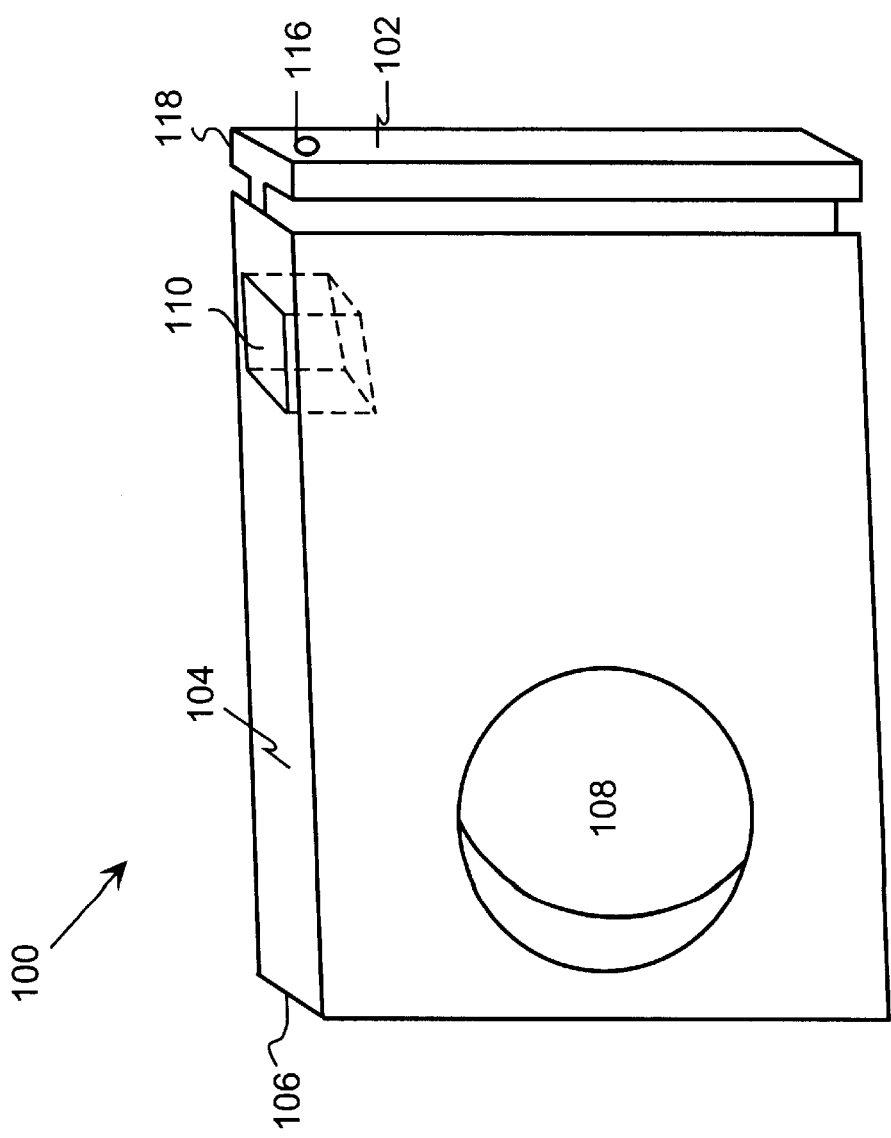

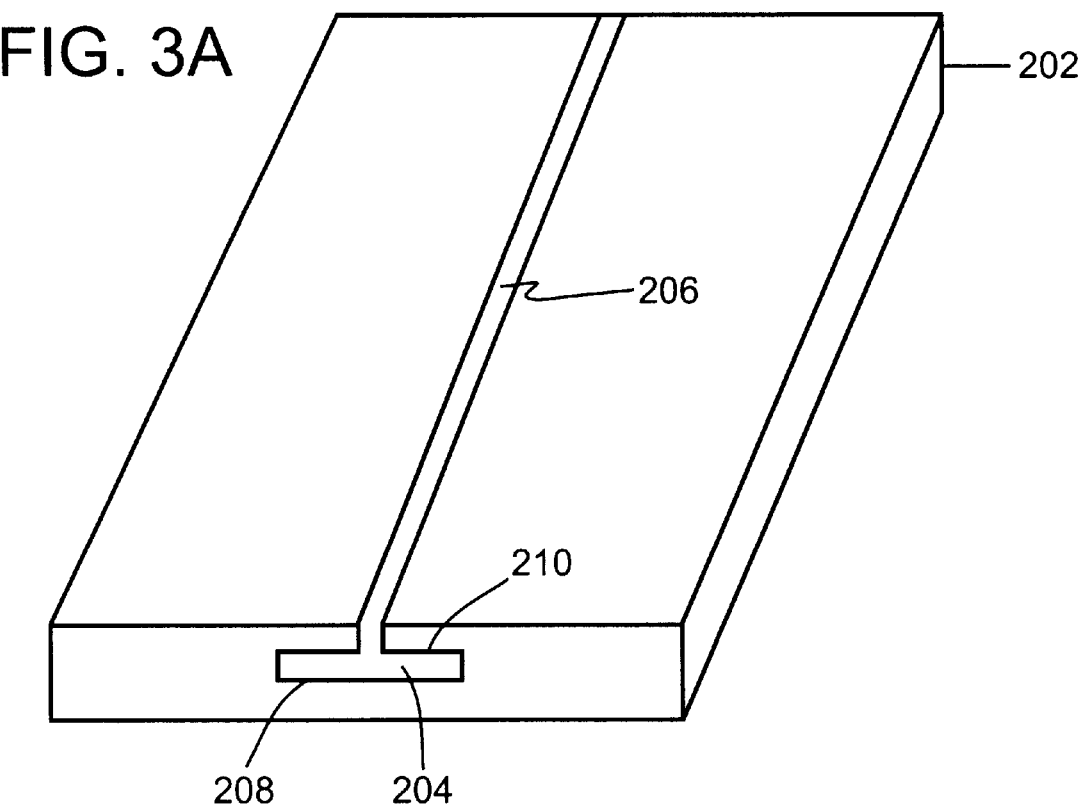
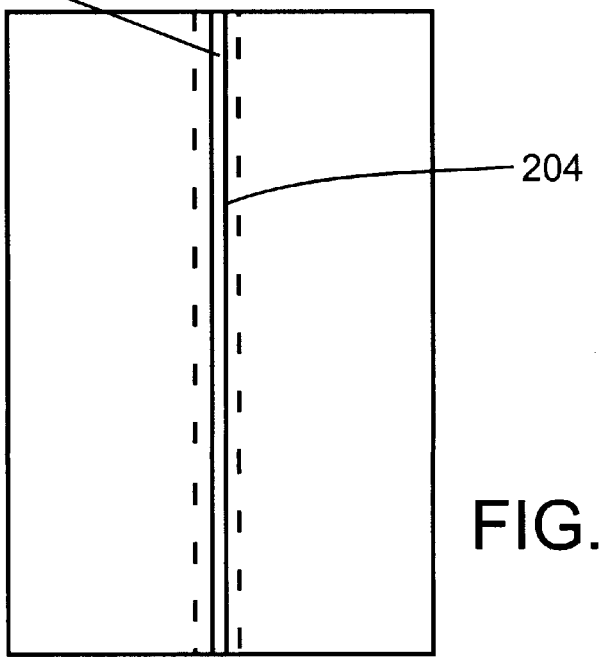

VARIABLE HEIGHT SENSOR TREE

BACKGROUND OF THE INVENTION

1. Field of Invention

The present invention relates to a novel variable position sensor device. The device has particular applicability in setting a sensor, for example, a liquid level or concentration sensor, at a desired location in a chemical holding vessel.

2. Description of the Related Art

In the semiconductor manufacturing industry, extensive use is made of liquid chemicals in wafer cleaning and etching processes. Process tanks and other liquid holding vessels may include one or more sensors to monitor, for example, the level of a liquid or the concentration of a component in a liquid solution contained therein. Conventionally, such sensors have themselves been fixedly attached to the liquid-containing vessel or have otherwise been fixedly attached to sensor holders which in turn are fixed to the vessel. To change the position of the conventional sensor or sensor holder on the vessel, the liquid must be drained from the vessel, holes drilled in the liquid containing vessel at each position at which the sensor is to be placed, and the sensor or sensor holder fixed in place using a suitable fastener.

Relocation of the sensor in the conventional manner described above is inefficient and expensive. In this regard, the sensor cannot be moved to a new position without taking the vessel out of service for a significant period of time to readjust the sensor position. In the case of a semiconductor manufacturing process, cleaning of the vessel is necessary to ensure that the liquid chemical to be contained therein is not contaminated. This cleaning can lead to extensive downtime of a process, which can result in significant expense.

It is, therefore, an object of the present invention to provide a variable height sensor tree which allows for sensor placement and adjustment in a fast and facile manner.

SUMMARY OF THE INVENTION

According to a first aspect of the present invention, a variable position sensor device is provided. The device includes a fixed track attached to a track holder. An adjustable sensor holder is adapted to receive a sensor and is capable of sliding and locking into position on the fixed track.

According to a second aspect of the present invention, a variable position sensor device comprises a holding vessel having a fixed track attached thereto and an adjustable sensor holder adapted to receive a sensor. The adjustable sensor holder is capable of sliding and locking into position on the vertical track.

BRIEF DESCRIPTION OF THE DRAWINGS

The objects and advantages of the invention will become apparent from the following detailed description of the preferred embodiments thereof in connection with the accompanying drawings, in which like reference numerals denote like features, and in which:

FIGS. 1A–C illustrate an exploded view of an exemplary variable position sensor device in accordance with the invention;

FIGS. 3A and 3B are a perspective and front view of a fixed track of the exemplary variable position sensor device;

DETAILED DESCRIPTION OF THE PREFERRED EMBODIMENTS OF THE INVENTION

Figure 2:
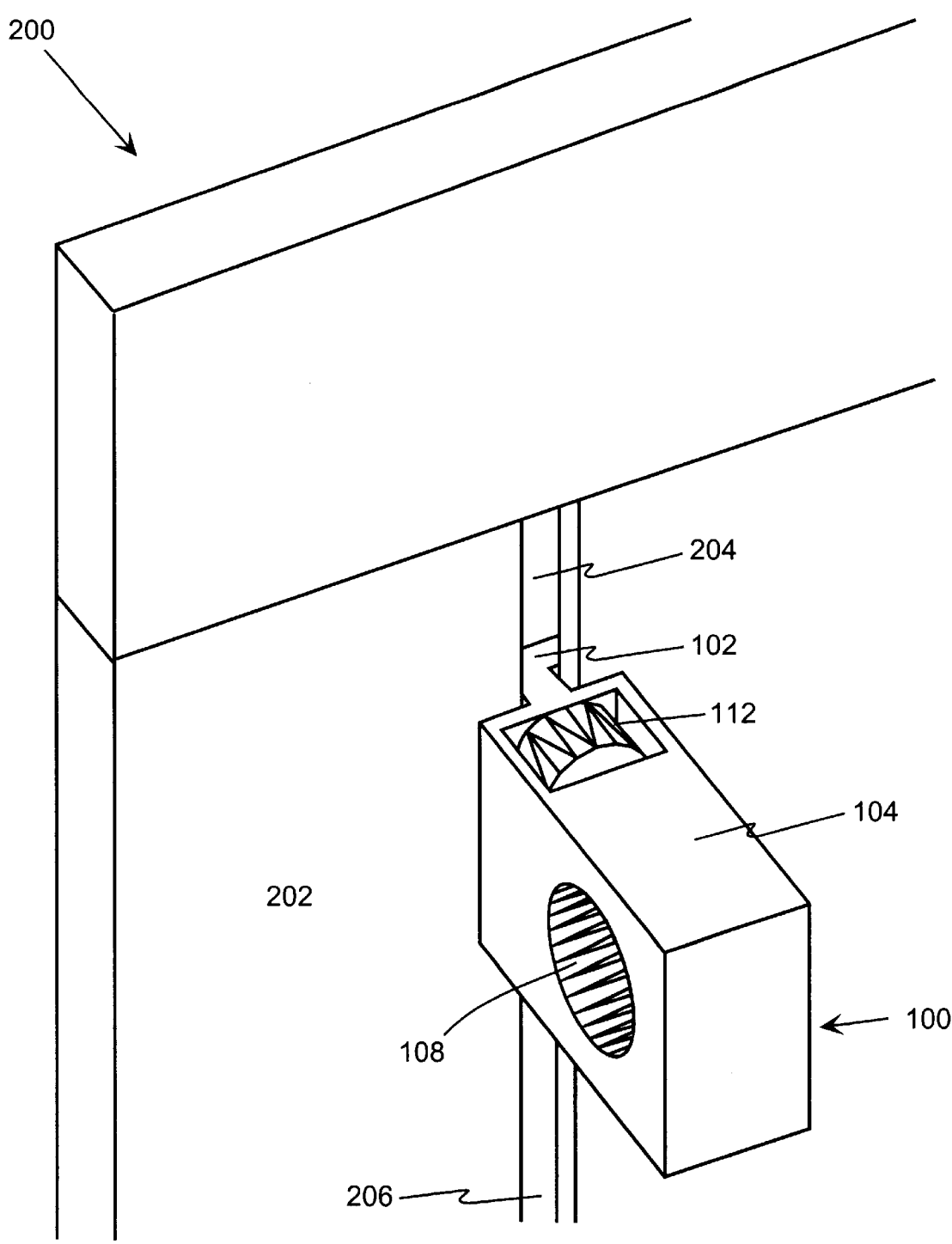
FIG. 2 is a blown-up view of the exemplary variable position sensor device slidingly engaged to a track.

The invention will be described with reference to FIGS. 1A–C, which illustrate an exploded view of an exemplary adjustable sensor holder 100 in accordance with one aspect of the invention.

Adjustable sensor holder 100 includes a proximal end 102, an upper portion 104, and a distal end 106. Sensor holder 100 has an aperture 108 therein to receive a sensor. The sensor can be of any type. For example, in the case of liquid solutions, the sensor can be a liquid level sensor or one used to measure or monitor the concentration of a component in the liquid solution.

An aperture 110 is formed in the upper portion 104 of sensor holder 100. An additional aperture 116 extending from aperture 110 to proximal end 102 is also formed in the sensor holder. A locking mechanism such as a grooved thumb wheel locking device 112 as illustrated in FIG. 1B is housed in aperture 110. The locking device 112 is fitted with a screw 114 or other type of fastening mechanism which can be extended and retracted by the locking mechanism.

With reference to FIGS. 2 and 3A–B, a fixed track 202 is fixedly attached to a track holder 200. The fixed track 202 includes an opening 204 along the length thereof and a groove 206 continuous therewith to slidingly engage the proximal end 102 of one or more sensor holders 100. Proximal end 102 of sensor holder 100 is configured to correspond to the opening in fixed track 202 and to slidingly fit into the track through groove 206.

The shape of the opening 204 in the track is designed to match the shape of the proximal end 102 of the sensor holder to allow for slidable adjustment and locking into position of the sensor holder. The proximal end 102 is preferably configured in a T-shape, in which case opening 204 can be rectangular in cross-section. The groove 206 is disposed continuous with the opening and faces sensor holder 100, to engage proximal end 102.

Upon establishing a desired location for the sensor holder 100, the holder can be locked into position on fixed track 202 by rotating the thumb wheel locking device 112 in a first direction. Fastening means 114 extends through aperture 116 of proximal end 102 into opening 204 in the fixed track and contacts wall 208 of the fixed track. As the fastening means 114 continues to be rotated in the first direction, back side 118 of the proximal end 102 is forced against wall 210 of the fixed track, thereby locking the sensor holder 100 into position on track 202. To unlock the holder and slidably move it to a new location on track 202, the thumb wheel locking device is rotated in a direction opposite to the first direction. Fastening means 114 is retracted into proximal end 102, thereby releasing the tension engagement between the proximal end and fixed track.

Figure 4:
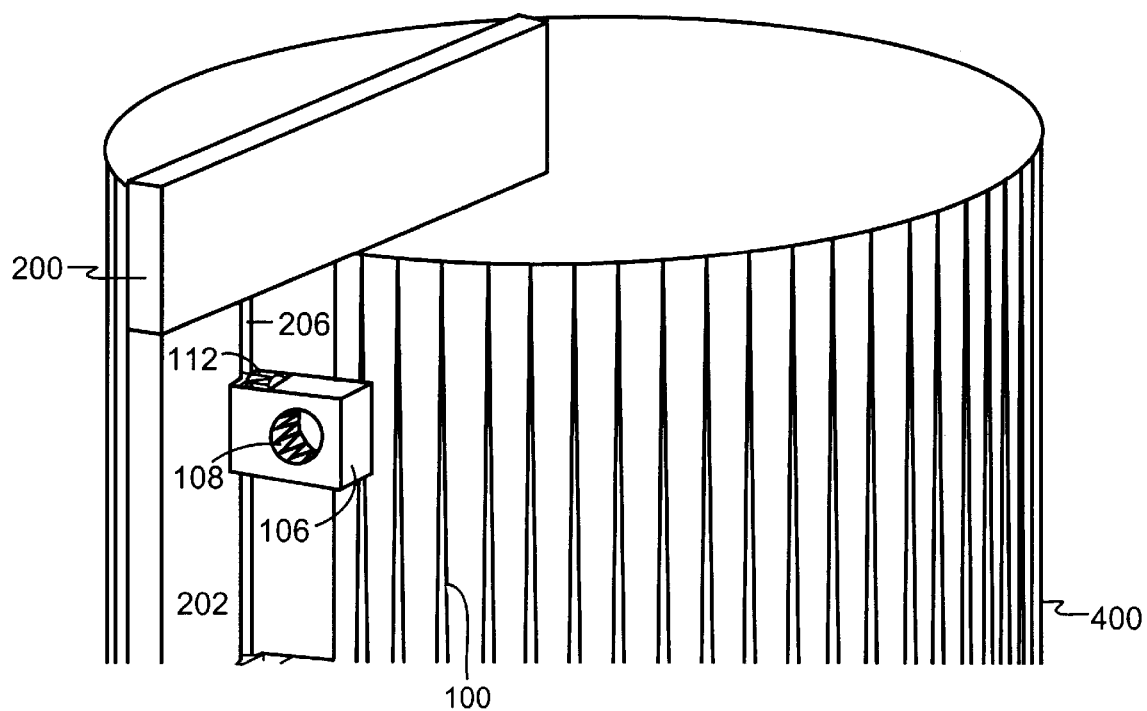
FIG. 4 is a perspective view of the variable position sensor device attached to a holding vessel according to an exemplary aspect of the invention.

With reference to FIG. 4, another aspect of the invention will be described, wherein the variable position device described above is attached to a liquid holding vessel 400. In this embodiment, the previously described sensor holder 100 and fixed track 202 can be attached to the holding vessel 400, with, for example, a liquid level or concentration sensor attached to sensor holder 100.

Figure 5:
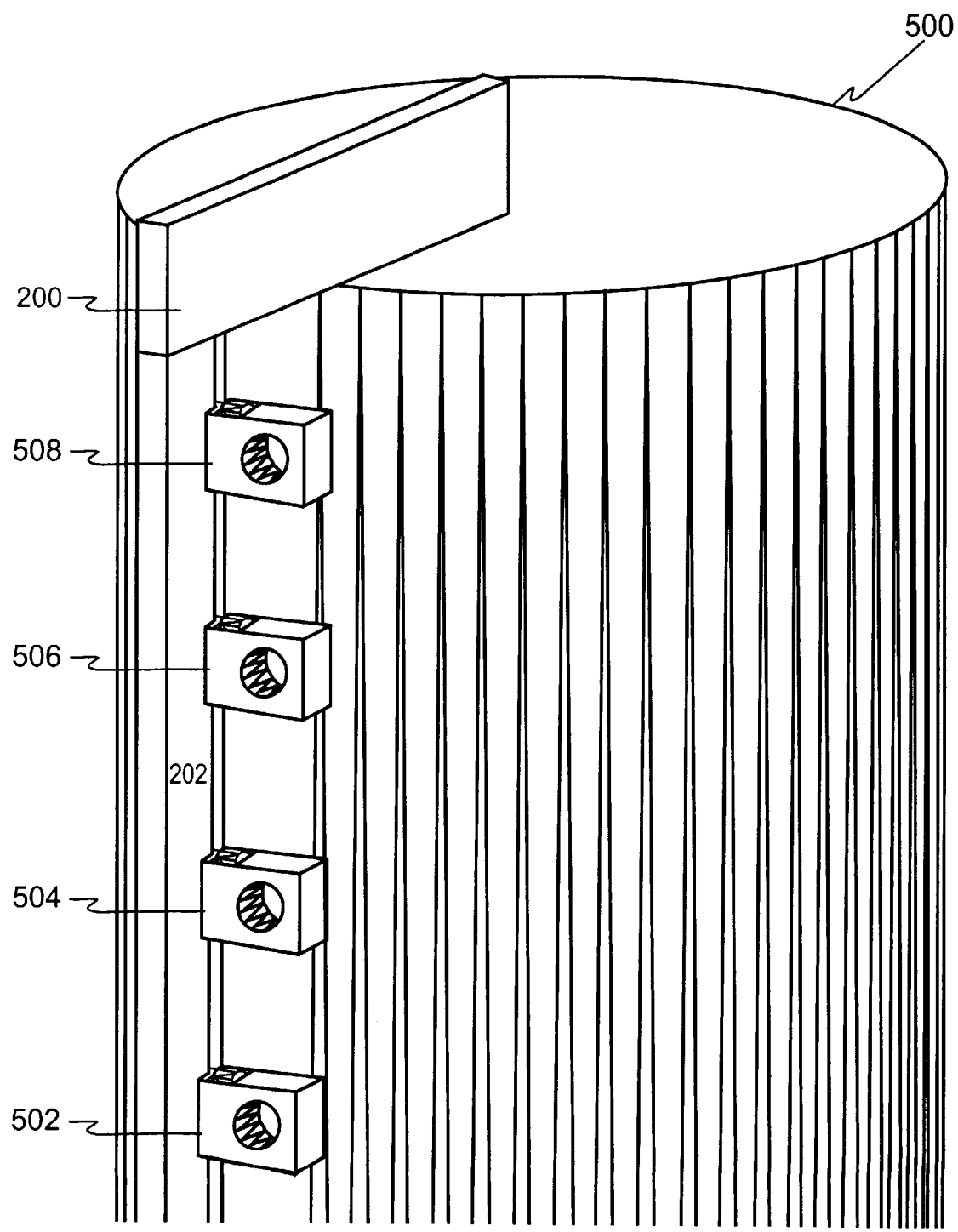
FIG. 5 is a vessel according to one aspect of the invention including a track with four sensor holders attached thereto.

A particularly advantageous way to achieve the objectives of the invention is by integrating a plurality of the previously described adjustable sensor holders 100 at different positions on a single track 202. This aspect of the invention will be described with reference to FIG. 5, which illustrates a multi-sensor device 500 as applied to a liquid holding vessel 400. This aspect of the invention finds particular applicability in the sensing of liquid levels in a liquid holding vessel. For such applications, it is desirable to employ capacitive proximity switches as the sensors.

When sensing liquid levels, a high liquid level sensor and a low liquid level sensor are typically used. When the liquid level reaches the height of the high liquid lever sensor, the sensor signal is sent to a controller for closing a liquid supply valve, thereby cutting off supply of the liquid to the vessel. On the other hand, when the liquid level drops beyond the low liquid level sensor, the sensor signal causes the controller to open a liquid supply valve for filling the liquid vessel up until the high liquid level sensor is reached. A redundant high liquid level sensor and a redundant low liquid level sensor can also be employed in the event the high or low liquid level sensor is not operational.

In such a configuration a first sensor holder 502 is placed at a desired position on the vessel for holding the low redundant liquid level sensor. A second sensor holder 504 is placed at a desired position above sensor holder 502 for holding the low liquid level sensor. Above sensor holder 504 is disposed a third sensor holder 506 for holding the high liquid level sensor, above which is disposed a fourth sensor holder 508 for holding the redundant high liquid level sensor.

In addition to the single track-multiple sensor holder arrangement described above, plural track-single or plural track-multiple sensor holder arrangements are also envisioned. Such arrangements may be desired, for example, where redundancy of sensors at the same relative position is desired.

While the invention has been described in detail with reference to specific embodiments thereof, it will be apparent to one skilled in the art that various changes and modifications can be made, and equivalents employed, without departing from the scope of the appended claims.

What is claimed is:

1. A variable position sensor device comprising: a fixed track attached to a track holder, and an adjustable sensor holder adapted to receive a sensor and capable of sliding and locking into position on said fixed track, said adjustable sensor holder includes a proximal end to said fixed vertical track, an upper portion and a distal end, wherein said proximal end is configured to slidingly fit into said fixed track, wherein said adjustable holder includes a thumb wheel locking member disposed on the upper portion of said adjustable holder to lock and unlock said holder at a desired position along the fixed track.

2. A variable position sensor device according to claim 1, further comprising a sensor held by said sensor holder.

3. A variable position sensor device according to claim 2, wherein the sensor is a proximity switch.

4. A variable position sensor device according to claim 1, wherein said fixed track includes an opening with a groove therein to accommodate said adjustable proximal end of said adjustable sensor holder.

5. A variable position sensor device according to claim 4, wherein said vertical track opening is generally rectangularly shaped with said groove located within the length disposed on the outward part of said rectangularly shaped opening for sliding movement of said adjustable sensor holder.

6. A variable position sensor device according to claim 1, wherein said proximal end is configured in a generally T-shape adapted to slidingly fit onto said fixed track.

7. A variable position sensor device according to claim 1, wherein the track holder forms a portion of a holding vessel.

8. A variable position sensor device comprising: a holding vessel having a fixed track attached thereto, and an adjustable sensor holder adapted to receive a sensor, said adjustable sensor holder being capable of sliding and locking into position on said vertical track, wherein said adjustable sensor holder includes a proximal end to said fixed vertical track, an upper portion and a distal end, wherein said proximal end is configured to slidingly fit onto said fixed track, and wherein said adjustable holder includes a thumb wheel locking member disposed on the upper portion of the adjustable holder to lock and unlock the adjustable holder to a desired position along the fixed track.

9. A variable position sensor device according to claim 8, further comprising a sensor held by said sensor holder.

10. A variable position sensor device according to claim 9, wherein the sensor is a proximity switch.

11. A variable position sensor device according to claim 8, wherein said fixed track includes an opening with a groove therein to accommodate said adjustable proximal end of said adjustable sensor holder.

12. A variable position sensor device according to claim 11, wherein said vertical track opening is generally rectangularly shaped with said groove located within the length disposed on the outward part of said rectangularly shaped opening for sliding movement of said adjustable sensor holder.

13. A variable position sensor device according to claim 8, wherein said proximal end is configured in a generally T-shape adapted to slidingly fit onto said fixed track.

14. A variable position sensor device according to claim 8, wherein the track holder forms a portion of a holding vessel.

* * * * *